J. W. EVANS.
Railroad Car-Springs.

No. 146,238. Patented Jan. 6, 1874.

Witnesses:
Michael Ryan.
Fred Haynes

James W. Evans
by his Attorneys
Brown & Allen

UNITED STATES PATENT OFFICE.

JAMES W. EVANS, OF NEW YORK, N. Y.

IMPROVEMENT IN RAILROAD-CAR SPRINGS.

Specification forming part of Letters Patent No. 146,238, dated January 6, 1874; application filed May 2, 1873.

*To all whom it may concern:*

Be it known that I, JAMES W. EVANS, of the city, county, and State of New York, have invented an Improvement in Springs for Railroad-Cars, and other purposes, of which the following is a specification:

This invention relates to that description of springs in which inner and outer metallic spiral springs have combined with them an interposed rubber spring, the whole being arranged to extend between two end plates or heads constructed to receive the ends of such entire spring. The invention consists in a combination, with the inner and outer metallic spiral springs, of an interposed rubber spring composed of a coil or coils of rubber of any suitable shape in its or their transverse section, and made either solid or hollow. A combined rubber and metallic spring thus constructed causes the rubber to have a better supporting action on or of the metal springs, to prevent breakage, than where the rubber spring consists of one or more cylinders, and the spring generally is a more efficient and durable one, particularly when used as a buffer-spring.

Figure 1:
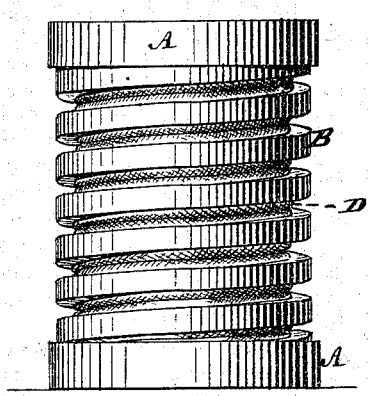
Figure 2:
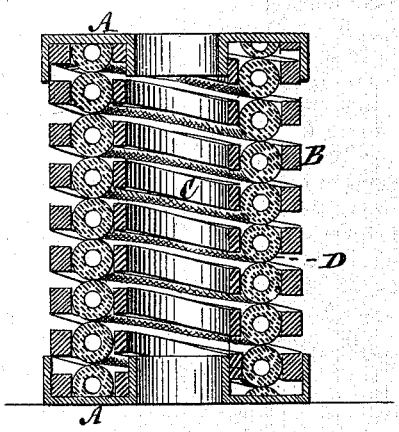

In the accompanying drawing, which forms part of this specification, Figure 1 represents an outside longitudinal view of a buffer-spring constructed in accordance with my invention, and Fig. 2 is a longitudinal section of the same.

Similar letters of reference indicate corresponding parts.

A A represent the end plates or heads of the combined rubber and metallic spring, said heads being suitably constructed on their interior faces to hold and receive within them the ends of the rubber and metallic springs, and to provide for the passage through or within them, without rubbing against the inner metallic spiral spring, of a rod or bar such as used in buffer-springs. B is the outer metallic spring, which may be made of steel; and C, the inner metallic spiral spring, of like material. These springs are arranged at a suitable distance apart, to receive between them the coiled rubber spring D, formed of a coil or coils, each of which, if more than one, is composed of a strip, either solid or tubular, and of any suitable shape in its transverse section, but preferably round or polygonal, and the meeting lines of the coiled strip being intermediate of the coils of the metallic springs, and its outside diameter or surfaces in contact with the inner surface of the outer metallic spring B and outer surface of the inner metallic spring C. The rubber spring thus constructed and arranged is free from abrasion, and most effectually serves to support the metallic springs and prevent their breakage.

What is here claimed, and desired to be secured by Letters Patent, is—

The compound spring, composed of the coiled rubber spring D, and the inner and outer spiral metallic springs B and C, and the caps A A, the whole combined substantially as herein set forth.

JAMES W. EVANS.

Witnesses:
WM. H. SCOVILL,
CHAS. N. DAYTON.